(12) United States Patent
Inoue et al.

(10) Patent No.: US 6,255,392 B1
(45) Date of Patent: Jul. 3, 2001

(54) CURABLE COMPOSITION FOR TOP COATING AND ARTICLES COATED THEREWITH

(75) Inventors: Masaharu Inoue, Kobe; Yoshiyuki Kono, Akashi; Seigo Nakamura, Takasago; Toshiro Nanbu, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/297,385

(22) PCT Filed: Oct. 29, 1997

(86) PCT No.: PCT/JP97/03942
§ 371 Date: Apr. 30, 1999
§ 102(e) Date: Apr. 30, 1999

(87) PCT Pub. No.: WO98/18873
PCT Pub. Date: May 7, 1998

(30) Foreign Application Priority Data

Oct. 31, 1996 (JP) .................................................. 8-290835

(51) Int. Cl.$^7$ ............................................................. C08F 30/08
(52) U.S. Cl. ........................... 525/101; 525/100; 525/105; 525/106; 525/132; 525/146; 525/326.5; 525/342
(58) Field of Search .................................. 525/100, 101, 525/105, 106, 132, 146, 326.5, 342

(56) References Cited

U.S. PATENT DOCUMENTS

| 4,371,664 | * | 2/1983 | Kato et al. ............................ 525/100 |
| 5,115,014 | * | 5/1992 | Wakabayashi et al. ............... 524/506 |
| 5,134,194 | * | 7/1992 | Inoue et al. ............................ 525/64 |
| 5,344,879 | | 9/1994 | Inoue et al. ........................... 525/100 |
| 5,399,607 | | 3/1995 | Nanbu et al. ......................... 524/385 |
| 5,650,475 | * | 7/1997 | Marutani et al. ...................... 528/26 |
| 5,840,806 | * | 11/1998 | Komazaki et al. ................... 525/101 |
| 5,886,125 | * | 3/1999 | Huybrechts ............................ 528/32 |
| 6,080,816 | * | 6/2000 | Gregorovich et al. ............... 525/100 |

FOREIGN PATENT DOCUMENTS

| 5345879 | 12/1993 | (JP) . |
| 6136324 | 5/1994 | (JP) . |
| 827413 | 1/1996 | (JP) . |
| WO 91/16383 | 10/1991 | (WO) . |

* cited by examiner

Primary Examiner—Robert Dawson
Assistant Examiner—Jeffrey B. Robertson
(74) Attorney, Agent, or Firm—Leydig, Voit & Mayer, Ltd.

(57) ABSTRACT

A curable topcoat composition comprising (A) 100 to 30 parts by weight of a vinyl copolymer having a main chain substantially composed of a vinyl copolymer, having both at least one specific hydrolyzable silyl group and at least one hydroxyl group in its main chain end and/or side chain, and having a carbonato structure in its main chain and/or side chain, (B) 0.001 to 70 parts by weight of a hydroxyl group-containing compound having no hydrolyzable silyl group, and (C) a solvent, the total of the components (A) and (B) being 100 parts by weight. The coating films formed from the curable composition are excellent in acid resistance, scratch resistance, appearance and thermosetting property and, in particular, the composition can be suitably used as a top coat for automobiles.

8 Claims, No Drawings

CURABLE COMPOSITION FOR TOP COATING AND ARTICLES COATED THEREWITH

TECHNICAL FIELD

The present invention relates to a curable composition for top coating which is suitably applied to, for example, automobiles, industrial equipments, steel furnitures, building interior and exterior, household electric appliances and plastic products, and an article coated with a clear top coat comprising the curable composition as a main component. More particularly, the invention relates to a curable composition for top coating which exhibits excellent acid resistance, scratch resistance, appearance and thermosetting property and which can be suitably used particularly as a top coat for automobiles, and a coated article using it.

BACKGROUND ART

Paints composed mainly of a melamine resin such as alkyd-melamine resin or acrylic melamine resin have been conventionally used for coating automobiles, industrial equipments, steel furnitures, interior and exterior of buildings, household electric appliances, plastic products and the like.

However, such paints composed mainly of a melamine resin has problems that harmful formaline is generated at the time of curing, and that the cured coating films are attacked by acid rain because they are poor in acid resistance. In particular, the problem of acid rain resulting from air pollution assumes a serious aspect in recent years, and there is observed a phenomenon that etching, whitening or spotting occurs in the coating films.

In order to solve the problems, it is proposed to use, in paints, a blend of a vinyl copolymer having a hydrolyzable silyl group and an acrylic polyol, or a copolymer of a vinyl monomer having a hydrolyzable silyl group and a vinyl monomer having an alcoholic hydroxyl group.

The use of a blend of a vinyl copolymer having a hydrolyzable silyl group and an acrylic polyol, or the use of a copolymer of a vinyl monomer having a hydrolyzable silyl group and a vinyl monomer having an alcoholic hydroxyl group has the advantage that coating films formed therefrom are superior in acid resistance and weatherability as compared with paints composed mainly of a melamine resin such as acrylic melamine or alkyd-melamine resin, since the hydrolyzable silyl group and the alcoholic hydroxyl group form stable siloxane bonds or siloxy bonds to cure.

However, in case of using a blend of a vinyl copolymer having a hydrolyzable silyl group and an acrylic polyol, or a copolymer of a vinyl monomer having a hydrolyzable silyl group and a vinyl monomer having an alcoholic hydroxyl group, the scratch resistance is not always sufficient. It is proposed to introduce a flexible component having a polyester structure in order to impart a scratch resistance. However, there is a case that the introduction rather lowers the acid resistance and hardness, so this proposal is not satisfactory in this respect.

For example, in case of top coat finishing of automobiles, metallic color finishing and solid color finishing have been generally adopted. In case of the solid color finishing, an alkyd-melamine resin paint has been conventionally used and generally cured in a one coat-one bake manner. Recently, in compliance with strict demands of properties such as appearance of finishing, weatherability, acid resistance and scratch resistance, it is proposed to coat on the solid color finishing a clear paint, e.g., an acrylic-melamine resin paint, a paint containing the above-mentioned blend system of a hydrolyzable silyl group-containing vinyl copolymer and an acrylic polyol, or a paint containing a vinyl copolymer having both a hydrolyzable silyl group and an alcoholic hydroxyl group in the same molecule. In this case, it is also proposed to introduce a flexible component having a polyester structure into the clear paint resin in order to raise the scratch resistance, but it is known that the acid resistance and hardness are not always satisfactory.

Thus, it is an object of the present invention to provide a curable topcoat composition which not only exhibits excellent acid resistance and scratch resistance, but also is excellent in balance of physical properties of coating films such as weatherability, appearance and hardness.

Another object of the present invention is to provide articles coated with the curable composition.

DISCLOSURE OF THE INVENTION

The present invention provides a curable topcoat composition comprising:

(A) 100 to 30 parts by weight of a vinyl copolymer the main chain of which consists essentially of a vinyl copolymer, and which has in its molecule at the main chain end and/or the side chain both at least one of alcoholic hydroxyl group and phenolic hydroxyl group and at least one hydrolyzable silyl group of the formula (I):

(I)

wherein $R^1$ and $R^2$ are hydrogen atom or a monovalent hydrocarbon group selected from the group consisting of an alkyl group having 1 to 10 carbon atoms, an aryl group and an aralkyl group, and a is 0, 1 or 2, and which has a carbonato structure of the formula (II):

(II)

in the main chain and/or the side chain, (B) 0.001 to 70 parts by weight of a hydroxyl group-containing compound having no hydrolyzable silyl group, and (C) a solvent, the total amount of the components (A) and (B) being 100 parts by weight.

Further, the present invention provides a coated article wherein a clear top coat comprising as a main component the above-mentioned curable topcoat composition is coated onto the surface coated with a paint containing a metallic powder and/or a color pigment.

The term "vinyl" as used herein denotes that a substance is derived from a compound having a polymerizable C=C bond, such as vinyl group or vinylidene group.

BEST MODE FOR CARRYING OUT THE INVENTION

Component (A)

In the present invention used is a vinyl copolymer (A) the main chain of which consists essentially of a vinyl copolymer, and which has in its molecule at the main chain end and/or the side chain both at least one hydroxyl group of an alcoholic hydroxyl group and a phenolic hydroxyl group (hereinafter referred to as "alcoholic hydroxyl group and the like") and at least one hydrolyzable silyl group (including silanol group) of the formula (I):

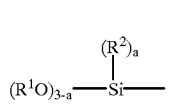
(I)

wherein $R^1$ and $R^2$ are a hydrogen atom or a monovalent hydrocarbon group selected from the group consisting of an alkyl group having 1 to 10 carbon atoms, an aryl group and an aralkyl group, and a is 0, 1 or 2, and if a plurality of $R^1$ or $R^2$ groups are present, they may be the same or different, and which has a carbonato structure of the formula (II):

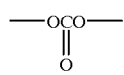
(II)

in the main chain and/or the side chain. Since the main chain of the vinyl copolymer (A) is substantially composed of a vinyl copolymer chain, coating films formed from the obtained curable composition have good properties such as weatherability and chemical resistance. Also, since the vinyl copolymer (A) has at least one hydrolyzable silyl group (I) in its molecule, it has a curability. Further, since the vinyl copolymer (A) has both at least one hydrolyzable silyl group (I) and at least one alcoholic hydroxyl group and the like in its molecule, it is excellent in curability under heat curing conditions, thus raising the crosslinking density of cured products. Further, because of having a carbonate structure, a scratch resistance is imparted without lowering the acid resistance.

It is sufficient that at least one hydrolyzable silyl group (I) is present in a molecule of the vinyl copolymer (A), but it is preferable that the vinyl copolymer (A) has 2 to 10 silyl groups (I) per one molecule, since the coating films formed from the obtained curable composition is superior in solvent resistance.

In the formula (I), $R^1$ is a hydrogen atom or a monovalent hydrocarbon group selected from an alkyl group having 1 to 10 carbon atoms (preferably an alkyl group having 1 to 4 carbon atoms such as methyl group, ethyl group, n-propyl group, isopropyl group, n-butyl group, isobutyl group or t-butyl group), an aryl group (e.g., a group having 6 to 25 carbon atoms such as phenyl group) and an aralkyl group (e.g., a group having 7 to 12 carbon atoms such as benzyl group). Of these, alkyl groups having 1 to 10 carbon atoms, especially alkyl groups having 1 to 4 carbon atoms, are preferred, since they are superior in reactivity of the hydrolyzable silyl group as compared with the aryl group and the aralkyl group. If the number of carbon atoms of the alkyl group is more than 10, the reactivity of the hydrolyzable silyl group tends to be lowered.

Also, in the formula (I), $R^2$ is a hydrogen atom or a monovalent hydrocarbon group selected from an alkyl group having 1 to 10 carbon atoms (preferably an alkyl group having 1 to 4 carbon atoms examples of which have been shown with respect to $R^1$), an aryl group (a group having 6 to 25 carbon atoms such as phenyl group) and an aralkyl group (a group having 7 to 12 carbon atoms such as benzyl group). Of these, alkyl groups having 1 to 10 carbon atoms, especially alkyl groups having 1 to 4 carbon atoms, are preferred from the viewpoint of being superior in the curability of the obtained composition.

From the viewpoints of water resistance, alkali resistance and acid resistance of the coating films, the above-mentioned hydrolyzable silyl group is preferred to be a group bonded to a carbon atom as shown by the formula (III):

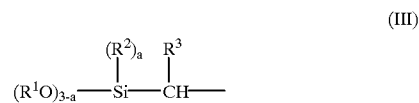
(III)

wherein $R^1$ and $R^2$ are as defined above, and $R^3$ is a hydrogen atom, methyl group or ethyl group.

Further, in the formula (I), a is 0, 1 or 2. From the viewpoint of curability, it is preferable that a is 0 or 1, particularly 0.

The amount of the hydrolyzable silyl group included in the vinyl copolymer (A) is preferred, from the viewpoint that curable compositions having excellent thermosetting property, acid resistance, weatherability and the like, to be that the hydrolyzable silyl equivalent, which is shown by the weight (g) of the vinyl copolymer (A) containing 1 mole of a hydrolyzable silyl group (I), is from 400 to 10,000 g/mole, especially 410 to 7,000 g/mole, more especially 450 to 5,000 g/mole. If the hydrolyzable silyl equivalent is less than 400 g/mole, the internal stress of the cured products tends to become large, and if it is more than 10,000 g/mole, the curability tends to be lowered.

The carbonato structure (II) included in the vinyl copolymer (A) is for example a group introduced into the vinyl copolymer (A) by radical polymerization of a vinyl monomer having a carbonato structure as mentioned after or in a like manner. Since the vinyl copolymer (A) has a carbonato structure, the scratch resistance can be improved without lowering the acid resistance. The curability and weatherability are also superior as compared with mere blending of a vinyl polymer with a compound having a carbonato structure. From the viewpoint of a balance of the scratch resistance with acid resistance, curability and so on, the amount of the carbonato structure included in the vinyl copolymer (A) is preferred to be that the carbonato structure equivalent, which is shown by the weight (g) of vinyl copolymer (A) containing 1 mole of carbonato structure, is from 400 to 5,000 g/mole, especially 600 to 3,500 g/mole.

The vinyl copolymer (A) contains at least one alcoholic hydroxyl group and the like in the main chain and/or the side chain in order to further raise the curability. When at least one alcoholic hydroxyl group and the like, preferably 2 to 10 alcoholic hydroxyl groups and the like, are present in the main chain ends and/or the side chains, the curability under heat curing conditions and the like are excellent.

The hydroxyl equivalent of the vinyl copolymer (A), which is shown by the weight (g) of the vinyl copolymer (A) containing one mole of at least one hydroxyl group of alcoholic hydroxyl group and phenolic hydroxyl group, is from 400 to 5,000 g/mole, preferably 400 to 3,000 g/mole, more preferably 500 to 2,000 g/mole. If the hydroxyl equivalent is less than 400 g/mole, the weatherability of coating films formed from the obtained curable composition is liable to decrease. If the hydroxyl equivalent is more than 5,000 g/mole, the thermosetting property of the composition and the scratch resistance and impact resistance of the coating films tend to be lowered.

The molar ratio of the alcoholic hydroxyl group and the like to the hydrolyzable silyl group in the vinyl copolymer (A) (alcoholic hydroxyl group and the like/hydrolyzable silyl group) is preferably from 0.1 to 10, especially 0.5 to 7.5, more especially 0.7 to 6.0, from the viewpoints that curable compositions having excellent thermosetting property, acid resistance, weatherability and water resistance can be obtained.

The desired molar ratio falling within the above range is obtained, for example, by adjusting the amounts of a hydrolyzable silyl group-containing vinyl monomer and an alcoholic hydroxyl group-containing vinyl monomer which are used in the preparation of the vinyl copolymer (A).

The vinyl copolymer (A) is preferred to have a number average molecular weight of 1,000 to 20,000, especially 2,000 to 15,000, more especially 3,000 to 10,000, from the viewpoints of good thermosetting property of the obtained curable compositions and good physical properties such as durability of the coating films formed from the compositions.

The vinyl copolymers (A) may be used alone or in admixture thereof.

The vinyl copolymers (A) can be prepared, for example, by polymerizing a monomer component containing the following monomers (1) to (4).

(1) Hydrolyzable silyl group-containing vinyl monomer [monomer (A-1)]

(2) Carbonato structure-containing vinyl monomer [monomer (A-2)]

(3) Vinyl monomer containing alcoholic hydroxyl group and the like [monomer (A-3)]

(4) Other monomers copolymerizable therewith [monomer (A-4)]

If the carbonato-containing monomer (A-2) also contains the alcoholic hydroxyl group and the like, the use of the hydroxyl group-containing monomer (A-3) may be omitted.

Examples of the silyl group-containing monomer (A-1) are, for instance, a compound of the formula (IV):

$$CH_2=\overset{R^4}{\underset{}{C}}-\overset{R^2_a}{\underset{}{Si}}(OR^1)_{3-a} \quad (IV)$$

wherein $R^1$, $R^2$ and a are as defined above, and $R^4$ is a hydrogen atom or methyl group, e.g., $CH_2=CHSi(OCH_3)_3$, $CH_2=CHSi(OCH_3)_2$ (with $CH_3$ substituent), $CH_2=C(CH_3)Si(OCH_3)_3$, $CH_2=C(CH_3)Si(OCH_3)_2$ (with $CH_3$ substituent), $CH_2=CHSi(OC_2H_5)_3$, $CH_2=CHSi(OC_2H_5)_2$ (with $CH_3$ substituent), $CH_2=CHSi(OC_3H_7)_3$, $CH_2=CHSi(OC_4H_9)_3$, $CH_2=CHSi(OC_6H_{13})_3$, $CH_2=CHSi(OC_8H_{17})_3$, or $CH_2=CHSi(OC_{10}H_{21})_3$;

a compound of the formula (V):

$$CH_2=\overset{R^4}{\underset{}{C}}-COO(CH_2)_n-\overset{R^2_a}{\underset{}{Si}}(OR^1)_{3-a} \quad (V)$$

wherein $R^1$, $R^2$, $R^4$ and a are as defined above, and n is an integer of 1 to 12, e.g.

$CH_2=CHCOO(CH_2)_3Si(OCH_3)_3$, $CH_2=CHCOO(CH_2)_3Si(OCH_3)_2$ (with $CH_3$ substituent), $CH_2=C(CH_3)COO(CH_2)_3Si(OCH_3)_3$, $CH_2=C(CH_3)COO(CH_2)_3Si(OCH_3)_2$ (with $CH_3$ substituent), $CH_2=CHCOO(CH_2)_3Si(OC_2H_5)_3$, $CH_2=CHCOO(CH_2)_3Si(OC_2H_5)_2$ (with $CH_3$ substituent), $CH_2=C(CH_3)COO(CH_2)_3Si(OC_2H_5)_3$, $CH_2=C(CH_3)COO(CH_2)_3Si(OC_2H_5)_2$ (with $CH_3$ substituent), or $CH_2=C(CH_3)COO(CH_2)_{11}Si(OCH_3)_3$;

a compound of the formula (VI):

$$CH_2=\overset{R^4}{\underset{}{C}}-CH_2OCO(C_6H_4)COO(CH_2)_n-\overset{R^2_a}{\underset{}{Si}}(OR^1)_{3-a} \quad (VI)$$

wherein $R^1$, $R^2$, $R^4$, a and n are as defined above, e.g.

$CH_2=CH-CH_2OCO(o-C_6H_4)COO(CH_2)_3Si(OCH_3)_3$, or $CH_2=CH-CH_2OCO(o-C_6H_4)COO(CH_2)_3Si(OCH_3)_2$ (with $CH_3$ substituent);

a compound of the formula (VII):

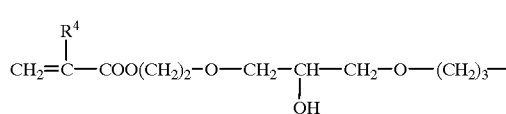
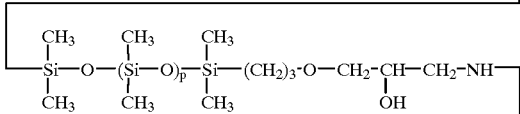
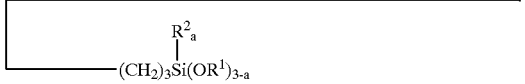

wherein $R^1$, $R^2$, $R^4$ and a are as defined above, and p is 0 or an integer of 1 to 22, e.g.

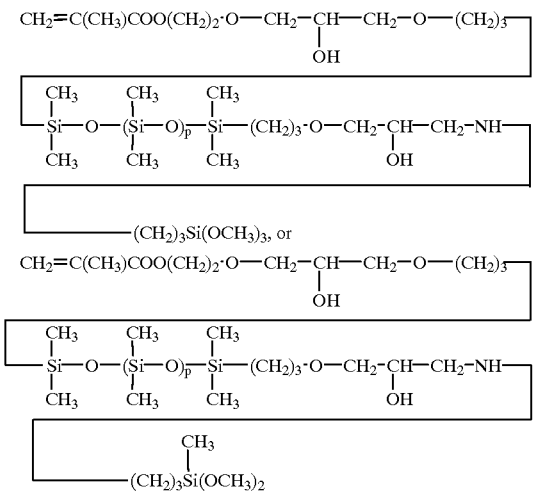

wherein p is 0 or an integer of 1 to 20;

a (meth)acrylate having the hydrolyzable silyl group (I) at the molecular end through a urethane bond or a siloxane bond; and the like. These may be used alone or in admixture thereof. Of these, the compound (V) is preferred, since it is easy to handle and is inexpensive and side reaction products are hard to be produced.

Preferably, the amount of the silyl group-containing monomer (A-1) is from 5 to 60% by weight, especially 10 to 50% by weight, of the whole amount of the monomer component. If the amount of the monomer (A-1) is less than 5% by weight, the acid resistance of coating films formed from the obtained curable compositions tends to become insufficient, and if the amount is more than 60% by weight, the storage stability of the curable compositions tends to be lowered.

Examples of the carbonato-containing monomer (A-2) are, for instance,

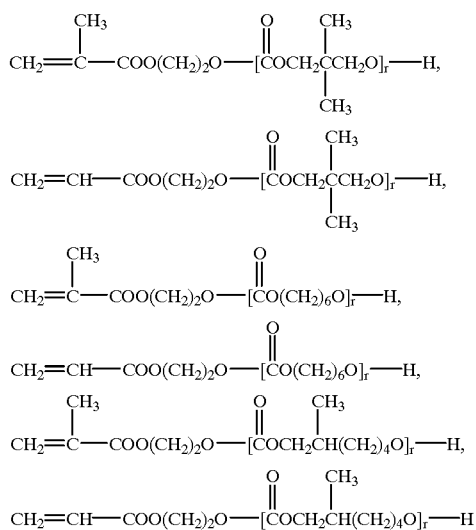

wherein r is an integer of 1 to 10. A typical example thereof is a compound commercially available under the trade mark HEAC-1 made by Daicel Chemical Industries, Ltd., which has a structure of the formula:

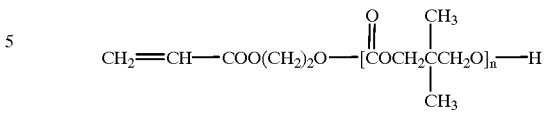

wherein n is 1 in average and which has a hydroxyl value of 170±10 mgKOH/g. The monomers (A-2) may be used alone or in admixture thereof.

Preferably, the amount of the carbonato-containing monomer (A-2) is from 5 to 60% by weight, especially 7 to 40% by weight, based on the whole amount of the monomer component. If the amount of the monomer (A-2) is less than 5% by weight, the coating films formed from the obtained compositions tend to lack the scratch resistance. If the amount is more than 50% by weight, the acid resistance and hardness of the coating films tend to be lowered.

Examples of the hydroxyl group-containing monomer (A-3) are, for instance, 2-hydroxyethyl (meth)acrylate, 1-hydroxypropyl (meth)acrylate, 2-hydroxypropyl (meth)acrylate, 2-hydroxybutyl (meth)acrylate, 4-hydroxybutyl (meth)acrylate, 2-hydroxyethyl vinyl ether, N-methylol (meth)acrylamide, ARONIX M-5700 which is a product made by Toagosei Chemical Industry Co., Ltd., 4-hydroxystyrene, an acrylic acid ester oligomer having a terminal hydroxyl group such as HE-10, HE-20, HP-1 or HP-20 which are products of Nippon Shokubai Co., Ltd., compounds of BLEMMER PP series (polypropylene glycol monomethacrylate), compounds of BLEMMER PE series (polyethylene glycol monomethacrylate), compounds of BLEMMER REP series (polyoxyethylene polyoxypropylene monomethacrylate), BLEMMER AP-400 (polypropylene glycol monoacrylate), BLEMMER AE-350 (polyethylene glycol monoarylate), compounds of UNIOX PKA series and UNISAFE PKA series (allylated polyethers), BLEMMER GLM (glycerol monomethacrylate) which all are products of Nippon Oil and Fats Co., Ltd., an $\epsilon$-caprolactone-modified hydroxyalkyl vinyl compound having a copolymerizability obtained by a reaction of a hydroxyl group-containing vinyl compound with $\epsilon$-caprolactone, and the like.

Typical examples of the $\epsilon$-caprolactone-modified hydroxyalkyl vinyl compound are, for instance, compounds of the formula (VIII):

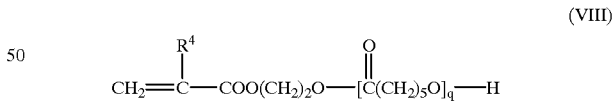

(VIII)

wherein $R^4$ is as defined above, and q is an integer of 1 to 4, e.g., Placcel FA-1 ($R^4$=H, q=1 in the formula VIII), Placcel FA-4 ($R^4$=H, q=4 in the formula VIII), Placcel FM-1 ($R^4$=CH$_3$, q=1 in the formula VIII), Placcel FM-4 ($R^4$=CH$_3$, q=4 in the formula VIII), TONE M-100 ($R^4$=H, q=2 in the formula VIII), or TONE M-201 ($R^4$=CH$_3$, q=1 in the formula VIII) wherein "Placcel" is a trade mark for the products of Daicel Chemical Industries, Ltd. and "TONE" is a trade mark for the products of Union Carbide Corporation.

The hydroxyl group-containing monomers (A-3) may be used alone or in admixture thereof.

2-Hydroxypropyl (meth)acrylate, 2-hydroxyethyl (meth)acrylate, 4-hydroxybutyl (meth)acrylate and the $\epsilon$-caprolactone-modified hydroxyalkyl vinyl compound, particularly 2-hydroxyethyl (meth)acrylate, are preferred as the monomer (A-3) from the viewpoints of good acid resistance and water resistance of coating films formed from the obtained curable compositions.

Preferably, the amount of the hydroxyl group-containing vinyl monomer (A-3) is from 5 to 60% by weight, especially 7 to 40% by weight, based on the whole amount of the monomer component. As stated above, when the carbonato-containing monomer (A-2) also has an alcoholic hydroxyl group and the like, the use of the monomer (A-3) may be omitted. If the amount of the monomer (A-3) is more than 60% by weight, the acid resistance and water resistance of coating films formed from the obtained compositions tend to be insufficient. It is preferable to use the monomer (A-3) in an amount of at least 5% by weight in order to obtain the effects produced by the use thereof.

Examples of the other monomers (A-4) copolymerizable with the monomers (A-1) to (A-3) are, for instance, a (meth)acrylic acid derivative, e.g., methyl (meth)acrylate, ethyl (meth)acrylate, n-butyl (meth)acrylate, isobutyl (meth) acrylate, t-butyl (meth)acrylate, 2-ethylhexyl (meth) acrylate, isobornyl (meth)acrylate, stearyl (meth)acrylate, benzyl (meth)acrylate, cyclohexyl (meth)acrylate, trifluoro-ethyl (meth)acrylate, pentafluoropropyl (meth)acrylate, perfluorocyclohexyl (meth)acrylate, (meth)acrylonitrile, glycidyl (meth)acrylate, methylglycidyl (meth)acrylate, Cyclomer M-100 and Cyclomer A-200 which are products of Daicel Chemical Industries, Ltd., dimethylaminoethyl (meth)acrylate, diethylaminoethyl (meth)acrylate, (meth) acrylamide, α-ethyl (meth)acrylamide, N-methyl (meth) acrylamide, N,N-dimethyl (meth)acrylamide, N-butoxymethyl (meth)acrylamide, a macromer such as AS-6, AN-6, AA-6, AB-6 or AK-5 (which are products of Toagosei Chemical Industry Co., Ltd.), a phosphate group-containing vinyl compound such as a condensation product of a hydroxyalkyl ester of α, β-ethylenically unsaturated carboxylic acid (e.g. a hydroxyalkyl (meth)acrylate) with phosphoric acid or a phosphoric acid ester, or a (meth) acrylate containing an urethane bond or siloxane bond; an aromatic hydrocarbon vinyl compound such as styrene, α-methylstyrene, chlorostyrene, styrenesulfonic acid or vinyl toluene; an unsaturated carboxylic acid such as maleic acid, fumaric acid or itaconic acid, its salt such as alkali metal salt, ammonium salt or amine salt; an unsaturated carboxylic anhydride such as maleic anhydride; an ester of the unsaturated carboxylic acid, e.g. a diester or half ester of the unsaturated carboxylic acid or anhydride with a linear or branched alcohol having 1 to 20 carbon atoms; a vinyl ester or allyl ester such as vinyl acetate, vinyl propionate or diallyl phthalate; an amino group-containing vinyl compound such as vinylpyridine or aminoethyl vinyl ether; an amido group-containing vinyl compound such as itaconic acid diamide, crotonamide, maleic acid diamide, fumaric acid diamide or N-vinylpyrrolidone; and other vinyl compounds such as methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid. These monomers may be used alone or in admixture thereof.

In particular, when an epoxy group-containing monomer such as glycidyl methacrylate, methylglycidyl methacrylate, Cyclomer M-100 or Cyclomer A-200 is used, the curability can be further raised. In this case, the amount thereof is preferably at most 50% by weight, more preferably at most 35% by weight, based on the whole amount of the monomer component. If the amount of such an epoxy group-containing monomer exceeds 50% by weight, the water resistance and acid resistance of coating films formed from the curable compositions tend to lower.

When a polar monomer having a group such as amino group, carboxyl group, sulfonic acid group or phosphoric acid group is used as the monomer (A-4), it is preferable to use it in an amount of at most 5% by weight based on the whole amount of the monomer component in order to minimize occurrence of crosslinking reaction at the time of polymerization.

Segments containing or composed of urethane bonds or siloxane bonds may be introduced into the main chain of the vinyl copolymer in an amount not exceeding 50% by weight of the vinyl copolymer (A) in order to improve the weatherability, solvent resistance and impact resistance of coating films formed from the obtained curable compositions.

The vinyl copolymer (A) used in the present invention can be prepared from the monomers (A-1), (A-2), (A-3) and the like by a method, for instance, as disclosed in Japanese Patent Publication Kokai No. 54-36395 or No. 57-55954. A solution polymerization method using an azo radical polymerization initiator such as azoisobutyronitrile is preferred from the viewpoint of easiness in synthesis.

Solvents to be used in the solution polymerization are not particularly limited so long as they are non-reactive. Examples of the solvent are, for instance, a hydrocarbon such as toluene, xylene, n-hexane or cyclohexane; an acetic acid ester such as ethyl acetate or butyl acetate; an alcohol such as methanol, ethanol, isopropanol or n-butanol; an ether such as ethyl cellosolve, butyl cellosolve or cellosolve acetate; a ketone such as methyl ethyl ketone, ethyl acetoacetate, acetylacetone, diacetone alcohol, methyl isobutyl ketone or acetone; and the like.

The solvents may be used alone or in admixture thereof. It is preferable that the polymerization solvent contains 1 to 30 parts by weight of an alcohol such as methanol or butanol based on 100 parts by weight of the monomer component, since gellation may occur during the polymerization if the amount of the alcohol in the polymerization solvent is less than 1 part by weight.

In the solution polymerization, a chain transfer agent may be used in order to control the molecular weight of the vinyl copolymer (A).

Examples of the chain transfer agent are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si—S—S—Si(OCH_3)_3$, $(CH_3O)_3Si—S_8—Si(OCH_3)_3$, and the like. These may be used alone or in admixture thereof. Particularly, when using a chain transfer agent having a hydrolyzable silyl group in its molecule, such as γ-mercaptopropyltrimethoxysilane, it is possible to introduce the hydrolyzable silyl group into the vinyl copolymer (A) at the polymer chain end.

The amount of the chain transfer agent is preferably from about 0.1 to about 10% by weight based on the monomer component.

Component (B)

The hydroxyl group-containing compound (B) having no hydrolyzable silyl group may be vinyl homopolymers or copolymers. It is preferable that the hydroxyl equivalent (g/mol) is at least 160, especially at least 240, more especially at least 400, and is at most 5,000, especially at most 4,000, more especially at most 3,500. If the hydroxyl equivalent is less than 160, the water resistance tends to lower. If the hydroxyl equivalent is more than 5,000, there is a tendency that the component (B) is difficult to react with the vinyl copolymer (A). Also, from the viewpoint of the durability and the like of coating films obtained from the compositions of the present invention, it is preferable that the hydroxyl group-containing compound (B) is a copolymer (hereinafter referred to as "acrylic polyol") of a hydroxyl group-containing vinyl monomer and a vinyl monomer containing no hydroxyl group.

The amount of the hydroxyl group-containing vinyl monomer in the acrylic polyol is preferably from 5 to 60% by weight, especially 7 to 50% by weight, based on the whole amount of the monomer component. If the content exceeds 60% by weight, the water resistance of the obtained coating films tends to lower.

The hydroxyl group-containing vinyl monomers included as a comonomer in the acrylic polyol are not particularly limited, and include, for instance, 2-hydroxyethyl (meth) acrylate, 2-hydroxypropyl (meth)acrylate, 2-hydroxybutyl (meth)acrylate, 4-hydroxybutyl (meth)acrylate, 2-hydroxyethyl vinyl ether, N-methylol (meth)acrylamide, 4-hydroxystyrene vinyl toluene, Aronix 5700 made by Toa Gohsei Kagaku Kogyo Kabushiki Kaisha, 4-hydroxyl styrene, HE-10, HE-20, HP-1 and HP-20 (which are acrylate oligomers having terminal hydroxyl group) which are products of Nippon Shokubai Co., Ltd., Blenmer PP series (polypropylene glycol methacrylate), Blenmer PE series (polyethylene glycol monomethacrylate), Blenmer PEP series (polyethylene glycol-polypropylene glycol methacrylate), Blenmer AP-400 (polypropylene glycol monoacrylate) and Blenmer AE-350 (polyethylene glycol monoacrylate), Uniox PKA series (allylated polyether), Unisafe PKA series (allylated polyether) and Blenmer GLM (glycerol monomethacrylate) which are products of NOF Corporation, a copolymerizable ε-caprolactone-modified hydroxyalkyl vinyl compound obtained by a reaction of a hydroxyl group-containing vinyl compound with ε-caprolactone, and the like. The hydroxyl group-containing vinyl monomers may be used alone or in admixture thereof. Of these hydroxyl group-containing vinyl monomers, 2-hydroxyethyl (meth)acrylate, 2-hydroxypropyl (meth) acrylate and 4-hydroxybutyl (meth)acrylate are particularly preferred from the viewpoints of acid resistance and compatibility.

The vinyl monomers containing no hydroxyl group which are copolymerizable with the hydroxyl group-containing vinyl monomers are also not particularly limited. Examples thereof are, for instance, methyl (meth)acrylate, ethyl (meth) acrylate, butyl (meth)acrylate, isobutyl (meth)acrylate, tert-butyl (meth)acrylae, cyclohexyl (meth)acrylate, 3,3,5-trimethylcyclohexyl (meth)acrylate, 2-ethylhexyl (meth) acrylate, isobornyl (meth)acrylate, stearyl (meth)acrylate, benzyl (meth)acrylate, cyclohexyl (meth)acrylate, trifluoroetyl (meth)acrylate, pentafluoropropyl (meth)acrylate, perfluorocyclohexyl (meth)acrylate, (meth)acrylonitrule, an unsaturated polycarboxylic acid ester, e.g., a diester or half ester of an unsaturated polycarboxylic acid (such as maleic acid, fumaric acid or itaconic acid) with a linear or branched alcohol having 1 to 20 carbon atoms; an aromatic hydrocarbon vinyl compound such as styrene, α-methylstyrene, chlorostyrene, styrenesulfonic acid, 4-hydroxystyrene, vinyl toluene or sodium styrenesulfonate; an unsaturated carboxylic acid such as (meth)acrylic acid, maleic acid or fumaric acid and its salt such as alkali metal salt, ammonium salt or amine salt; an unsaturated carboxylic acid anhydride such as maleic anhydride, an unsaturated carboxylic acid ester such as a diester or half ester of the unsaturated carboxylic acid anhydride with a linear or branched alcohol having 1 to 20 carbon atoms; a vinyl ester or an allyl compound such as vinyl acetate, vinyl propionate or allyl phthalate; a nitrile group-containing vinyl compound such as (meth) acrylonitrile; an epoxy group-containing vinyl compound such as glycidyl (meth)acrylate; a basic nitrogen atom-containing vinyl compound such as dimethylaminoethyl (meth)acrylate, diethylaminoethyl (meth)acrylate, vinyl pyridine or aminoethyl vinyl ether; an amido group-containing vinyl compound such as (meth)acrylamide, itaconic acid diamide, α-ethyl (meth)acrylamide, crotonamide, maleic acid diamide, fumaric acid diamide, N-vinyl pyrrolidone, N-butoxymethyl (meth)acrylamide, N,N-dimethyl acrylamide, N-methyl acrylamide or acryloyl morpholine; and other vinyl compounds such as methyl vinyl ether, cyclohexyl vinyl ether, vinyl chloride, vinylidene chloride, chloroprene, propylene, butadiene, isoprene, a fluoroolefin maleimide, N-vinyl imidazole and vinylsulfonic acid. Of these monomers, acrylic acid, methacyrylic acid, their ester compounds and styrene are preferred from the viewpoints of copolymerizability and chemical resistance of the obtained curable compositions. These vinyl monomers having no hydroxyl group which are copolymerizable with the hydroxyl group-containing vinyl monomers may be used alone or in admixture thereof.

The obtained acrylic polyols may contain in its main chain less than 50% by weight of a segment formed by a urethane bond or a siloxane bond.

From the viewpoint of easiness in control of the degree of polymerization, it is preferable to conduct the preparation of the acrylic polyols by a solution polymerization using a radical initiator.

In the solution polymerization, a chain transfer agent such as n-dodecylmercaptan may be used, as occasion demands, in order to control the molecular weight.

Non-reactive solvents are usually employed as the polymerization solvent, but the solvents are not particularly limited.

Examples of the acrylic polyol are, for instance, Almatex 748-5M and 748-16AE made by Mitsui Toatsu Kagaku Kabushiki Kaisha, Desmophen A series made by Sumitomo Bayer Urethane Kabushiki Kaisha; Acrydic A-801 made by Dainippon Ink and Chemicals, Inc., and the like.

The acrylic polyols may be used alone or in admixture thereof.

From the viewpoints of breaking stress and elongation of films and control in rheology of paints, it is preferable that the acrylic polyols are non-aqueous dispersion polymer.

The non-aqueous dispersion polymer denotes a polymer stably dispersed in an organic medium, as shown in K. E. J. Barett, Dispersion Polymerization in Organic Media, John Wiley & Sons., London (1975). This polymer is formed of (1) a core portion and (2) an arm portion. The core portion (1) is insoluble in the organic solvent, but the arm portion (2) is soluble in the organic solvent. Both may combine through a covalent bond, for instance, by a reaction of a carboxylic acid and an epoxy group.

As the organic solvent, there are mainly used, for example, low polar hydrocarbon solvents such as cyclohexane, heptane, mineral spirit and xylene. However, alcohols such as methanol and 1-butanol or ketones such as acetone and cyclohexanone may be used in combination therewith so long as the above-mentioned solubililty is satisfied.

The core portion is composed of a polymer dispersed in an organic medium. The arm portion (2) is a polymer which itself is soluble in the organic medium, and serves as a stabilizer which forms a stereobarrier by bonding to the core portion (1).

The core portion (1) is composed of a macromolecular polymer having a number average molecular weight of 15,000 to 300,000. The arm portion (2) serves as a stabilizer which forms a stereobarrier and is macromer chains bonded to the core portion (1).

The core portion (1) is made of a copolymer of vinyl monomers. These vinyl monomers are not particularly limited and include, for instance, acrylic acid, methacrylic acid, their alkyl, hydroxyalkyl, allyl and glycidyl esters; styrene; acrylonitrile; and the like. These may be used alone or in admixture thereof.

Preferably, the core portion (1) is composed of 10 to 50 parts by weight, especially 15 to 40 parts by weight, of at least one vinyl monomer having a hydroxyl group and 50 to 90 parts by weight, especially 60 to 85 parts by weight, of at least one vinyl monomer having no hydroxyl group, the total thereof being 100 parts by weight. If the amount of the hydroxyl group-containing vinyl monomer is less than 10 parts by weight, the difference in polarity between it and the arm portion (2) becomes small, so the dispersed polymer becomes unstable and is apt to agglomerate. If the amount is more than 50 parts by weight, for example, the water resistance of coating films tends to lower.

In the synthesis of the non-aqueous dispersion polymer, the arm portion (2) which is a polymer soluble in an organic solvent is firstly synthesized. A solvent and other additives can be added without hindrance so long as the polymer is soluble at the time of the synthesis or after the synthesis.

Monomers for forming the core portion (1) are then added and polymerized. A polymer corresponding to the arm portion (2) or a solvent may be added during the polymerization. There is no particular limitation in a manner of adding the monomer used for forming the core portion (1), the polymer (2) corresponding to the arm portion, the solvent or other additives such as a polymerization initiator or a chain transfer agent. For example, the whole of the monomer for forming the core portion may be added in the initial stage of the polymerization for forming the core portion and be polymerized, or a part of the monomer may be added in the initial stage and the rest may be added with the progress of the polymerization, or the whole of the monomer may be added with the progress of the polymerization. Also, any components of the core-forming monomer, the polymer corresponding to the arm portion, the solvent and other additives may be mixed and added to the polymerization system, and the remaining components be added separately at the same time or at a different time. In case that the addition is made with the progress of the polymerization, the addition may be intermittently or continuously, and the chance of adding the monomer and the like, the manner of the addition and the amount at that time and the like are not particularly limited so long as the desired non-aqueous dispersion polymer wherein the core portion and the arm portion are bonded to each other is obtained.

It is preferable to adjust the solid content of the obtained non-aqueous dispersion within the range of 50 to 70% by weight, especially 60 to 70% by weight, from the viewpoints of procedure in synthesis, handling after the synthesis and stability in storage, but the solid content is not limited to this range.

Preferably, the average particle size of the obtained dispersed particles is from 100 to 2,000 nm, especially 150 to 1,000 nm, more especially 200 to 600 nm. If the average particle size is less than 100 nm, the rheology adjustment of paints tends to become insufficient, and if it is more than 2,000 nm, the storage stability tends to be deteriorated. However, the average particle size and average molecular weight of the dispersed particles are not particularly limited so long as the rheology adjustment and the storage stability are good.

The arm portion (2) bonding to the core portion (1) accounts for 10 to 90% by weight, preferably 20 to 50% by weight, of the non-aqueous dispersion polymer. If the proportion of the arm portion (2) exceeds 90% by weight of the non-aqueous dispersion polymer, cured products having durability are hard to be obtained. If the proportion is less than 10% by weight, the viscosity of the non-aqueous dispersion polymer may rise or the stability of the non-aqueous dispersion polymer may be deteriorated to form precipitation.

The organic solvent-soluble polymer of the arm portion (2) is composed of 5 to 30 parts by weight, preferably 5 to 25 parts by weight, of at least one hydroxyl group-containing vinyl monomer and 70 to 95 parts by weight, preferably 75 to 95 parts by weight, of at least one vinyl monomer having no hydroxyl group, the total thereof being 100 parts by weight. If the amount of the hydroxyl group-containing vinyl monomer is less than 5 parts by weight, the curability is apt to lower. If the amount is more than 30 parts by weight, the solubility in organic solvents tends to lower or the stability of the non-aqueous dispersion polymer is apt to become insufficient.

Preferably, the number average molecular weight of the organic solvent-soluble polymer (2) is from 1,000 to 25,000, especially 1,000 to 15,000. If the number average molecular weight is less than 1,000, the stability of the non-aqueous dispersion polymer is apt to become insufficient. If the number average molecular weight is more than 25,000, the arm polymer is hard to be dissolved in organic solvents.

In case that the hydroxyl group-containing compound (B) is not a non-aqueous dispersion polymer, it is preferable to use the components (A) and (B) so that the number of alcoholic hydroxyl groups present in the component (B) is from not less than 0.001 to less than 0.1 per one $R^1O$—Si group in the component (A). If it is more than 0.1, there is a case where the water resistance and the like are lowered, and if it is less than 0.001, there is a case where the effects are not sufficiently exhibited.

In case that the hydroxyl group-containing compound (B) is a non-aqueous dispersion polymer, it is preferable to use the components (A) and (B) so that the number of alcoholic hydroxyl groups present in the arm portion (2) of the component (B) is less than 0.2, especially from not less than 0.001 to less than 0.1 per one $R^1O$—Si group in the component (A). If it is more than 0.2, there is a case where the water resistance and the like are lowered, and if it is less than 0.001, there is a case where the effects are not sufficiently exhibited.

In both cases, if the alcoholic hydroxyl group gains in number, there is a case where the acid resistance and water resistance are lowered.

In case that the hydroxyl group-containing compound (B) is not a vinyl homopolymer or copolymer, the hydroxyl equivalent (g/mol) is at least 160, preferably at least 240. If the hydroxyl equivalent is less than 160, the water resistance tends to lower. As to the upper limit, the hydroxyl equivalent is at most 5,000, especially at most 4,000, more especially at most 3,500.

Examples of the hydroxyl group-containing compound (B) which is not a vinyl homopolymer or copolymer are, for instance, organic polyols such as a polycaprolactone polyol, a polyvalerolactone polyol and a polyhexamethylene carbonate polyol. As the commercially available products, there can be used PLACCEL series polymers (L205AL, 305, L312AL, 405D, CD205, etc.) and the like.

The component (B) may be used alone or in admixture thereof.

In case that the component (B) is not a non-aqueous dispersion polymer, it is preferable that the number average molecular weight is from 1,000 to 25,000, especially 1,000 to 15,000. If the number average molecular weight is less than 1,000, there is a case where the weatherability and water resistance are lowered. If the number average molecular weight is more than 25,000, there is a case where the compatibility with other components is lowered.

The amount of the component (B) to be incorporated is from 0.001 to 70 parts by weight based on 100 parts by weight of the total of the components (A) and (B). If the amount of the component (B) is more than 70 parts by weight, there is a case where the acid resistance and water resistance are lowered. The amount is preferably at most 50 parts by weight, more preferably at most 40 parts by weight. It is preferable to use the component (B) in an amount of at least 0.1 part by weight in obtaining clear effects to be produced by the use of the component (B).

Component (C)

Typical examples of the solvent (C) are, for instance, a hydrocarbon solvent such as toluene, xylene, cylohexane, n-hexane or octane, an alcohol solvent such as methanol, ethanol, isopropanol, n-butanol, isobutanol, sec-butanol, t-butanol or ethylene glycol monoalkyl ether, an ester solvent such as methyl acetate, ethyl acetate or butyl acetate, a ketone solvent such as acetone, methyl ethyl ketone, methyl isobutyl ketone or cyclohexanone, and other solvents as used in the preparation of the vinyl copolymer (A). Of these, alcohol solvents are preferred from the viewpoint of giving a good result to stability, and it is more preferable to use them in combination with a dehydrating agent.

A solvent used in the polymerization of the component (A) may be used as the solvent (C) as it is.

The amount of the solvent (C) is not particularly limited. However, if it is too much, there is a tendency that defects such as foaming are easy to occur in coating films formed from the obtained curable compositions and, therefore, the solvent (C) is used usually in an amount of at most 250 parts by weight, preferably at most 200 parts by weight, more preferably at most 150 parts by weight, and in an amount of at least 15 parts by weight, preferably at least 25 parts by weight, per 100 parts by weight of the vinyl copolymer (A).

Examples of the dehydrating agent mentioned above are, for instance, methyl orthoformate, ethyl orthoformate, methyl orthoacetate, ethyl orthoacetate, trimethyl orthopropionate, triethyl orthopropionate, trimethyl orthoisopropionate, triethyl orthoisopropionate, trimethyl orthobutyrate, triethyl orthobutyrate, trimethyl orthoisobutyrate, triethyl orthoisobutyrate; dimethoxymethane, 1,1-dimethoxyethane, 1,1-dimethoxypropane, 1,1-dimethoxybutane; ethyl silicate (tetraethoxysilane), methyl silicate (tetramethoxysilane), methyltrimethoxysilane; and the like. Of these, methyl orthoacetate is preferred from the viewpoint of the dehydrating effect. The dehydrating agents may be used alone or in admixture thereof.

The dehydrating agent may be added at the time of the polymerization for the vinyl copolymer (A) or after the polymerization. If the amount of the dehydrating agent is too large, defects such as pinholes tend to be formed with ease in coating films formed from the obtained curable compositions. Therefore, it is desirable to use the dehydrating agent in an amount of at most 70 parts by weight, especially at most 50 parts by weight, more especially at most 20 parts by weight, per 100 parts by weight of the vinyl copolymer (A).

It is also preferable to us it in an amount of at least 1 part by weight, especially at least 2 parts by weight, from the viewpoint of surely obtaining effects to be produced by the use of the dehydrating agent.

Component (D)

A compound containing at least two carboxyl groups, preferably 2 to 6 carboxyl groups, in one molecule (carboxyl group-containing compound (D)) may be used in order to raise the recoating adhesion and curability.

The component (D) is obtained, as mentioned after, (D-1) by half-esterifying an acid anhydride compound with a polyol compound, (D-2) by copolymerizing a carboxyl group-containing monomer, or by other methods. Half esters (D-1) are preferred as the component (D) from the recoating adhesion of coating films obtained from the compositions of the present invention.

The amount of the hydroxyl group-containing compound (D) is at most 40 parts by weight, preferably at most 30 parts by weight, more preferably at most 25 parts by weight, per 100 parts by weight of the total of the components (A) and (B). From the viewpoint of surely obtaining effects to be produced by the use of the component (D), it is preferable to use it in an amount of at least 2 parts by weight, especially at least 5 parts by weight. If the amount of the component (D) is more than 40 parts by weight, there is a case where the water resistance or the storage stability at the time of preparing paints are lowered.

The half esters (D-1) are obtained by half esterification of an acid anhydride compound with a polyol compound having at least two hydroxyl groups, preferably 2 to 10 hydroxyl groups, per a molecule, and more preferably with a polyol compound having 3 to 6 hydroxyl groups per molecule from the viewpoint of balance of appearance and curability.

Examples of the polyol having at least two hydroxyl groups per molecule used for the synthesis of the component (D-1) are, for instance, a polyhydric alcohol such as ethylene glycol, 1,2- and 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,3-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, trishydroxyethylisocyanurate, dipentaerythritol or trishydroxymethylethane; a ring opening addition product of the polyhydric alcohol and a lactone such as γ-butyrolactone or ε-caprolactone; an addition product of the polyhydric alcohol and an isocyanate compound such as tolylene diisocyanate, diphenylmethane diisocyanate, hexamethylene diisocyanate or isophorone diisocyanate under excess alcohol condition; an addition product of the polylhydric alcohol and a vinyl ether compound such as ethylene glycol divinyl ether, polyethylene glycol divinyl ether, butanediol divinyl ether, pentanediol divinyl ether, hexanediol divinyl ether or 1,4-cyclohexanedimethanol divinyl ether under excess alcohol condition; a condensation product of the polyhydric alcohol and a silicone compound such as KR-213, KR-217 or KR-9218 (trade mark, products of Shin-Etsu Chemical Co., Ltd.) under excess alcohol condition; and the like. These may be used alone or in admixture thereof.

Preferable examples of the acid anhydride compound to be reacted with the above-mentioned polyol compound are hexahydrophthalic anhydride, phthalic anhydride, methyl-hexahydrophthalic anhydride, tetrahydrophthalic anhydride, trimellitic anhydride and the like. These may be used alone or in admixture thereof.

It is also possible to form a hydroxyl group-containing carboxylic acid oligomer by adjusting the proportions of the polyol compound and the acid anhydride compound to be reacted therewith.

It is preferable that the number average molecular weight of the component (D-1) is not more than 2,000, especially from 100 to 1,800.

The above-mentioned carboxyl group-containing copolymer (D-2) is obtained by copolymerization of at least one carboxyl group-containing monomer with a monomer selected from those exemplified for the monomers (A-3) and (A-4) excepting carboxyl group-containing monomers. Examples of the carboxyl group-containing monomer are, for instance, (meth)acrylic acid, maleic acid, fumaric acid, itaconic acid, and the like.

Preferably, the content of the carboxyl group-containing monomer is not more than 30% by weight. If the content of the carboxyl group-containing monomer is more than 30% by weight, the compatibility with the components (A) and (B) and the water resistance of coating films tends to be lowered.

The number average molecular weight of the carboxyl group-containing copolymer (D-2) is from 1,500 to 10,000, preferably 2,000 to 7,000.

Component (E)

The compositions of the present invention may contain a curing catalyst. The amount of the curing catalyst (E) is at most 10 parts by weight, preferably at most 5 parts by weight, per 100 parts by weight of the total of the components (A) and (B). The curability can be raised by using the catalyst within this range. It is preferable to use the component (E) in an amount of at least 0.001 part by weight, especially at least 0.1 part by weight, from the viewpoint of surely obtaining effects to be produced by the use thereof. If the amount of the component (E) is more than 10 parts by weight, the appearance and weatherability of coating films tend to be lowered.

Any compounds used as curing catalyst for hydrolyzable silyl group-containing compounds can be used as the curing catalyst (E) without particular restriction. Examples of the component (E) are, for instance, an organotin compound such as dibutyl tin dilaurate, dibutyl tin dimaleate, dioctyl tin dilaurate, dioctyl tin dimaleate or tin octylate; phosphoric acid and a phosphoric acid ester such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; an addition reaction product of phosphoric acid and/or the acid phosphoric acid ester with an epoxy compound such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane, Cardula E made by Yuka Shell Epoxy Kabushiki Kaisha, or Epikote 828 and 1001 made by Yuka Shell Epoxy Kabushiki Kaisha; an organotitanium compound; an organoaluminum compound; an organozinc compound; a carboxylic acid (an organic carboxylic acid compound) and its anhydride such as maleic acid, adipic acid, azelaic acid, sebacic acid, itaconic acid, citric acid, succinic acid, phthalic acid, trimellitic acid or pyromellitic acid; a sulfonic acid compound (an organic sulfonic acid compound) such as dodecylbenzenesulfonic acid, p-toluenesulfonic acid, 1-naphthalenesulfonic acid or 2-naphthalenesulfonic acid, and the sulfonic acid compound blocked with an nitrogen-containing compound such as 1-amino-2-propanol, monoethanolamine, diethanolamine, 2-(methylamino)ethanol, 2-dimethylethanolamine, 2-amino-2-methyl-1-propanol, diisopropanolamine, 3-aminopropanol, 2-methylamino-2-methylpropanol, morpholine, oxazolidine or 4,4-dimethyloxazolidine, 3,4,4-trimethyloxazolidine (a reaction product of the acid and an amine) (e.g., NACURE 5225, NACURE 5543 and NACURE 5925 made by King Industries Inc.); an amine compound such as hexylamine, di(2-ethylhexyl)amine, N,N-dimethyldodecylamine, dodecylamine, DABCO, DBU, morpholine or diisopropanolamine; a reaction product of an amine with an acid phosphoric acid ester or a sulfonic acid; an alkaline compound such as sodium hydroxide or potassium hydroxide; a quaternary ammonium salt or phosphonium salt such as benzyltriethylammonium chloride or bromide, or tetrabutylammonium chloride or bromide; and the like. The curing catalysts may be used alone or in admixture thereof.

Of these curing catalysts, sulfonic acid compounds blocked with a nitrogen-containing compound are preferred from the viewpoint of good balance of the curability in baking and the storage stability at ordinary temperature, wherein it is particularly preferable that the nitrogen-containing compound is at least one compound selected from a primary or secondary amine having at least one hydroxyl group, especially at most two hydroxyl groups (e.g., 2-amino-2-methyl-1-propanol or diisopropanolamine), morpholine and oxazolidine. Also, these preferable curing catalysts may be used in combination with the above-mentioned organotin compound, phosphoric acid or a phosphoric acid ester.

The equivalent ratio of the nitrogen-containing compound to the sulfonic acid compound is preferably from 1:0.75 to 1:3.0, more preferably from 1:1.0 to 1:2.0. If the amount of the sulfonic acid compound to the nitrogen-containing compound is less than the above range, the storage stability at ordinary temperature and the appearance tend to be deteriorated. If the amount is more than the above range, there is a tendency that the curability in baking is lowered or yellowing of coating films may occur.

Other Components

In addition to the components (A) to (E), preferably an amino resin is incorporated into the compositions of the present invention in an amount of at most 30 parts by weight, especially at most 15 parts by weight, more especially at most 5 parts by weight, per 100 parts by weight of the total of the components (A) and (B) in order to raise the curability and the appearance. It is preferable to use the amino resin in an amount of at least 1 part by weight, especially at least 2 parts by weight from the viewpoint of surely obtaining the effects to be produced by the use thereof. If the amount of the amino resin is more than 30 parts by weight, the acid resistance tends to lower.

Examples of the amino resin are, for instance, amino resins obtained by a reaction of an amino component such as melamine, urea, benzoguanamine, glycol urea, acetoguanamine or dicyandiamide with an aldehyde such as formaldehyde, paraformaldehyde, acetoaldehyde or benzaldehyde (methylolamino resins such as melamine resin, urea resin and guanamine resin), and the like. Of these, melamine resin is preferred from the viewpoints of improvement in appearance and good curability. Etherification products of the amino resins (e.g., methylolamino resin) with an alcohol such as methyl alcohol, ethyl alcohol, n-propyl alcohol, isopropyl alcohol, n-butyl alcohol, isobutyl alcohol, 2-ethylbutanol or 2-ethylhexanol may also be used.

Other examples of the amino resin are a n-butylated melamine resin such as Uban 20SE, 20SE-60, Uban 128, Uban 220, Uban 225, Uban 20SB, Uban 20SE-60, Uban 21R, Uban 22R, Uban 122, Uban 28-60, Uban 20HS, Uban 2028, Uban 202 or Uban 120 which are products of Mitsui Toatsu Chemicals, Inc., an isobutylated melamine resin such as Uban 62, Uban 69-1, Uban 169 or Uban 2061 which are products of Mitsui Toatsu Chemicals, Inc., a butylated urea resin such as Uban 10S-60 or Uban 10R which are products of Mitsui Toatsu Chemicals, Inc., a melamine resin such as Cymel 303, Cymel 232, Cymel 370, Cymel 325, Cymel 236, Cymel 738, Cymel 771, Cymel 327, Cymel 703, Cymel 701, Cymel 266, Cymel 267, Cymel 285, Cymel 235, Cymel 238, Cymel 1141, Cymel 272, Cymel 254, Cymel 202, Cymel 1156, Cymel 1158, Cymel 300, Cymel 301, Cymel 350 or Cymel 736 which are products of Mitsui Sytech Kabushiki Kaisha, and the like. Of these, alkyl-etherified melamine resins such as Cymel 235, Cymel 238 and Cymel 1158 are preferred from the viewpoint of curability.

In addition to the components (A) to (E), the compositions of the present invention may contain an organopolysiloxane silanol, a tetraalkoxysilane, an alkyltrialkoxysilane or their partial hydrolysis products in an amount of at most 50 parts by weight, especially at most 30 parts by weight, per 100 parts by weight of the total of the components (A) and (B) in order to further decrease the viscosity. If the organopolysiloxane silanol is incorporated in an amount exceeding 50 parts by weight, films may become fragile. Also, if the tetraalkoxysilane, alkyltrialkolxysilane or their partial hydrolysis products are incorporated in an amount exceeding 50 parts by weight, the compatibility may be lowered or the internal stress may be increased.

The weatherability can be further improved by incorporating a weatherabililty improver such as ultraviolet absorber or light stabilizer into the compositions of the present invention. In particular, the combination use of ultraviolet absorber and light stabilizer can more effectively improve the weatherability.

Examples of the ultraviolet absorber are, for instance, benzophenone, triazole, phenylsalicylate, diphenyl acrylate and acetophenone ultraviolet absorbers. These may be used alone or in admixture thereof.

Examples of the light stabilizer are, for instance, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)-2-(3,5-tert-butyl-4-hydroxybenzyl)-2-n-butylmalonate, tetrakis(2,2,6,6-tetramethyl-4-piperidyl)-1,2,3,4-butanetetracarboxylate, tetrakis-(1,2,2,6,6-pentamethyl-4-piperidyl)-1,2,3,4-butanetetracarboxylate, and the like. These may be used alone or in admixture thereof.

The ultraviolet absorber is used usually in an amount of 0.1 to 10 parts by weight, preferably 1 to 5 parts by weight, based on 100 parts by weight of the resin solid matter included in the composition of the present invention. The light stabilizer is used usually in an amount of 0.1 to 10 parts by weight, preferably 1 to 5 parts by weight, based on 100 parts by weight of the resin solid matter included in the composition of the present invention.

The compositions of the present invention are useful as paints applied to automobile, industrial equipments, steel furnitures, interior and exterior of buildings, household electric appliances and plastic products, particularly are very useful as top coat for automobiles.

The compositions of the present invention comprising the components (A) to (C) form coating films which not only exhibit acid resistance and scratch resistance, but also are excellent in balance of film properties such as weatherability, appearance and hardness.

When a copolymer of a hydroxyl group-containing vinyl monomer and a vinyl monomer having no hydroxyl group is used as the component (B), the formed coating films have a good durability. When a non-aqueous dispersion polymer is used as the component (B), there are obtained effects that, in addition to the durability, the breaking stress and elongation of films are further improved and also the obtained paints are excellent in rheology adjustment.

An explanation is given below with respect to an example of applying the compositions of the present invention.

Firstly, a paint containing a metallic powder and/or a color pigment is coated onto a material to be coated (substrate), and onto the coated surface is then coated a clear top coat comprising the composition of the present invention as a main component.

The paint containing a metallic powder and/or a color pigment (base coat) is not particularly limited and includes, for instance, amino alkyd resin, oil free alkyd resin, thermosetting acrylic resin, thermosetting urethane resin, nitrocelluloce lacquer, modified acrylic lacquer, straight acrylic lacquer, room temperature curable urethane resin, acrylic enamel resin, oxidizing cured alkyd resin, oxidizing cured modified (CAB, etc.) alkyd resin, room temperature or heat curable fluorocarbon resin, hydrolyzable silyl group-containing resin, the composition of the present invention, and mixtures thereof, into which a metallic powder and/or a color pigment are incorporated.

The paint containing a metallic powder and/or a color pigment may be any type of paint, e.g., solution type paint containing an organic solvent as a medium, non-aqueous dispersion paint, multi-liquid type paint, powder coating, slurry coating and aqueous paint.

The metallic powder and color pigment both are not particularly limited, and those conventionally used can be used in the present invention. Examples of the metallic powder are, for instance, aluminum powder, copper powder, mica powder, and the like. Examples of the color pigment are, for instance, an organic pigment such as phthalocyanine blue, toluididne red or benzidine yellow, and an inorganic pigment such as titanium oxide, carbon black or red iron oxide. These metallic powders and color pigments may be respectively used alone or in admixture thereof.

The weatherability of the coated articles can be further improved by incorporating ultraviolet absorbers and light stabilizers as mentioned above into the base coat.

The paint containing a metallic powder and/or a color pigment may be incorporated with a silicon compound such as tetraalkoxysilanes, alkyltrialkoxysilanes, their partial hydrolysis products, aminosilane compounds or epoxysilane compounds, preferably with aminosilane compounds, in order to improve the adhesion between a basecoat film and a clear topcoat film. In this case, the amount of the silicon compound is usually at most 20 parts by weight, preferably at most 10 parts by weight, and is at least 0.5 part by weight, based on 100 parts by weight of the paint containing a metallic powder and/or a color pigment.

The coated articles according to the present invention are those obtained by coating a clear top coat onto the surface coated with a base coat. The coated articles can be prepared, for instance, by a two coat one bake method wherein after coating the paint containing a metallic powder and/or a color pigment onto a material to be coated and setting it for several minutes, the clear top coat is coated thereon in a wet on wet manner and is thermally cured, or by a two coat two bake method wherein after coating the paint containing a metallic powder and/or a color pigment onto a material to be coated and thermally curing it, the clear top coat is coated thereon and thermally cured.

The clear top coat mentioned above is a paint containing the composition of the present invention as a main component, namely at least 50% by weight, especially from 75 to 100% by weight, of the composition of the present invention. Components incorporated therein other than the composition of the present invention include ultraviolet absorber, light stabilizer, rheology controlling agent, levelling agent and the like.

Application of the clear top coat can be conducted by various methods conventionally adopted, such as dipping, spraying, brushing, roll coating and flow coating. After the application, curing can be conducted by heating at a temperature of at least 30° C., preferably 55 to 350° C., more preferably 60 to 220° C.

The thickness of the coating films of the coated articles varies depending on the uses and, therefore, cannot be generically specified. However, from the viewpoint of hiding property and the like, the coating film containing metallic powder and/or color pigment is preferred to have a thickness of 10 to 30 μm. From the viewpoint of durability and the like, the coating film of the clear top coat is preferred to have a thickness of 20 to 60 μm.

The thus obtained coated articles of the present invention have excellent properties such as acid resistance, stain resistance, scratch resistance, weatherability, appearance and hardness.

The curable topcoat composition and coated articles using it of the present invention are explained below in detail by means of examples, wherein all parts and % are by weight unless otherwise noted. It is to be understood that the present invention is not limited to these examples.

SYNTHESIS EXAMPLE 1

Synthesis of Components (A-1) to (A-5), Component (B-1), Components (a-1) to (a-10) and Component (D-2)

A reactor equipped with a stirrer, a thermometer, a reflux condenser, a tube for introducing nitrogen gas and a dropping funnel was charged with "portion 2" shown in Tables 1 and 2. After raising the temperature to 115° C. with introducing a nitrogen gas, a solution of "portion 1" was added dropwise at a constant rate over 4 hours.

Thereto was then added dropwise a solution of "portion 3" at a constant rate over 0.5 hour. Thereafter, the mixture was stirred at 115° C. for 2 hours and cooled to room temperature. Finally, a solution of "portion 4" was added and stirred.

The solid concentration of the obtained solution, and the number average molecular weight (measured by gel permeation chromatography GPC), silyl equivalent, alcoholic hydroxyl equivalent and epoxy equivalent of the obtained copolymer are also shown in Tables 1 and 2.

In Tables 1 and 2, A-174 denotes γ-trimethoxysilylpropyl methacrylate (made by Nippon Unicar Kabushiki Kaisha), AIBN denotes 2,2'-azobisisobutyronitrile, V-59 denotes 2,2'-azobis(2-methylbutyronitrile) (made by Wako Pure Chemical Industries, Ltd.), Solvesso 100 denotes an aromatic hydrocarbon (made by Exxon Chemical Co.), and Y-9936 denotes γ-triethoxysilylpropyl methacrylate (made by Nippon Unicar Kabushiki Kaisha).

TABLE 1

| Components (A), (B) and (D) and others | A-1 | A-2 | A-3 | A-4 | A-5 | B-1 |
|---|---|---|---|---|---|---|
| Portion 1 (part) | | | | | | |
| Styrene | 130 | 130 | 40 | 130 | 100 | 200 |
| A-174 | 311 | 311 | 400 | 100 | — | — |
| Y-9936 | — | — | — | — | 200 | — |
| Methyl methacrylate | — | — | 40 | — | — | — |
| Butyl methacrylate | — | — | — | — | 40 | — |
| Isobutyl methacrylate | — | — | — | — | — | — |
| Cyclohexyl methacrylate | 200 | 200 | 35 | 137 | 100 | 140 |
| Glycidyl methacrylate | — | — | 150 | 340 | 280 | — |
| 2-Ethylhexyl acrylate | 9 | 147 | — | 10 | — | 400 |
| 2-Hydroxyethyl methacrylate | — | 90 | 30 | 80 | — | 260 |
| HEAC-1 | 350 | 122 | 305 | 203 | 280 | — |
| PLACCEL FM-1 | — | — | — | — | — | — |
| Acrylic acid | — | — | — | — | — | — |
| Total | 1000 | 1000 | 1000 | 1000 | 1000 | 1000 |
| Methanol | 20 | 20 | 20 | 20 | 20 | — |
| 1-Butanol | 55 | 55 | 55 | 55 | 55 | 34 |
| SOLVESSO 100 | 82 | 82 | 82 | 82 | 82 | 90 |
| AIBN | 38 | 38 | 40 | 38 | — | 40 |
| V-59 | — | — | 7 | — | — | 17 |
| t-Butylperoxy-2-ethylhexanoate | — | — | — | — | 48 | — |
| Portion 2 (part) | | | | | | |
| SOLVESSO 100 | 156 | 156 | 156 | 156 | 156 | 155 |
| 1-Butanol | 104 | 104 | 104 | 104 | 104 | 105 |
| Portion 3 (part) | | | | | | |
| V-59 | 2 | 2 | 3 | 2 | — | 3 |
| t-Butylperoxy-2-ethylhexanoate | — | — | — | — | 20 | — |
| Xylene | 50 | 50 | 50 | 50 | 50 | 100 |
| Portion 4 (part) | | | | | | |
| Methyl orthoacetate | 60 | 60 | 40 | 40 | 40 | — |
| Methanol | 20 | 20 | 20 | 20 | 20 | — |
| Properties | | | | | | |
| Solid concentration (%) | 63 | 63 | 64 | 64 | 64 | 66 |

TABLE 1-continued

| Components (A), (B) and (D) and others | A-1 | A-2 | A-3 | A-4 | A-5 | B-1 |
|---|---|---|---|---|---|---|
| Number average molecular weight | 5,800 | 5,800 | 5,100 | 5,900 | 5,500 | 4,600 |
| Alcoholic hydroxyl equivalent (g/mol) | 943 | 942 | 866 | 813 | 1179 | 500 |
| Silyl equivalent (g/mol) | 797 | 797 | 620 | 2480 | 1450 | — |
| Epoxy equivalent (g/mol) | — | — | 947 | 418 | 507 | — |
| Hydrolyzable silyl group/ alcoholic hydroxyl group (equivalent ratio) | 0.85 | 0.85 | 0.72 | 3.05 | 1.23 | — |

TABLE 2

| Components (A), (B) and (D) and others | a-6 | a-7 | a-8 | a-9 | a-10 | D-2 |
|---|---|---|---|---|---|---|
| Portion 1 (part) | | | | | | |
| Styrene | 130 | 130 | 40 | 130 | 100 | 150 |
| A-174 | 311 | 311 | 400 | 100 | — | — |
| Y-9936 | — | — | — | — | 200 | — |
| Methyl methacrylate | 16 | — | 80 | — | 40 | — |
| Butyl methacrylate | — | — | 80 | — | 80 | — |
| Isobutyl methacrylate | — | — | — | — | — | 350 |
| Cyclohexyl methacrylate | 200 | 200 | 50 | 137 | 100 | — |
| Glycidyl methacrylate | — | — | 150 | 340 | 280 | — |
| 2-Ethylhexyl acrylate | 205 | 100 | 50 | 133 | 100 | 350 |
| 2-Hydroxyethyl methacrylate | 138 | — | 150 | 160 | 100 | — |
| HEAC-1 | — | — | — | — | — | — |
| PLACCEL FM-1 | — | 259 | — | — | — | — |
| Acrylic acid | — | — | — | — | — | 150 |
| Total | 1000 | 1000 | 1000 | 1000 | 1000 | 1000 |
| Methanol | 20 | 20 | 20 | 20 | 20 | — |
| 1-Butanol | 55 | 55 | 55 | 55 | 55 | 60 |
| SOLVESSO 100 | 82 | 82 | 82 | 82 | 82 | 135 |
| AIBN | 38 | 38 | 40 | 38 | — | 40 |
| V-59 | — | — | 7 | — | — | 7 |
| t-Butylperoxy-2-ethylhexanoate | — | — | — | — | 48 | — |
| Portion 2 (part) | | | | | | |
| SOLVESSO 100 | 156 | 156 | 156 | 156 | 156 | 170 |
| 1-Butanol | 104 | 104 | 104 | 104 | 104 | 100 |
| Portion 3 (part) | | | | | | |
| V-59 | 2 | 2 | 3 | 2 | — | 3 |
| t-Butylperoxy-2-ethylhexanoate | — | — | — | — | 20 | — |
| Xylene | 50 | 50 | 50 | 50 | 50 | 100 |
| Portion 4 (part) | | | | | | |
| Methyl orthoacetate | 60 | 60 | 40 | 40 | 40 | — |
| Methanol | 20 | 20 | 20 | 20 | 20 | — |
| Properties | | | | | | |
| Solid concentration (%) | 63 | 63 | 64 | 64 | 64 | 62 |
| Number average molecular weight | 5,800 | 5,800 | 5,100 | 5,900 | 5,500 | 5,200 |
| Alcoholic hydroxyl equivalent (g/mol) | 942 | 942 | 867 | 813 | 1179 | — |
| Silyl equivalent (g/mol) | 797 | 797 | 620 | 2480 | 1450 | — |
| Epoxy equivalent (g/mol) | — | — | 947 | 418 | 507 | — |
| Hydrolyzable silyl group/ alcoholic hydroxyl group (equivalent ratio) | 0.85 | 0.85 | 0.72 | 3.05 | 1.23 | — |

SYNTHESIS EXAMPLE 2
Synthesis of Non-Aqueous Dispersion Polymer (B-2)

A reactor was charged with "portion 1" shown in Table 3 and was heated under reflux temperature (97° C.). To the reactor was added "portion 2", and immediately thereafter, "portion 3" and "portion 4" were added at a constant rate over 225 minutes.

At the beginning the mixture was transparent, but soon after the "portion 3" and "portion 4" were added, the mixture turned light blue and after 40 minutes it became cloudy white.

Thereafter, "portion 5" was added at a constant rate over 30 minutes and the mixture was further kept at a reflux temperature for 90 minutes.

Finally, excess solvent was removed to give a stable dispersion having a solid concentration of 63.4% which was cloudy, but did not cause layer separation.

The obtained dispersion had a Stormer viscosity of 76 KU and an average particle size of 300 nm.

Arm portion (2) is formed by the polymer in the solution containing organic solvent-soluble polymer (Mw=3,500) used in the "portion 1".

Core portion (1) is formed by a polymer of methacrylic acid, 2-hydroxyethyl acrylate, methyl methacrylate, methyl acrylate, styrene and glycidyl methacryalte in the "portion 3".

TABLE 3

Composition

| | | |
|---|---|---|
| Portion 1 | Solution containing organic solvent-soluble polymer (Mw = 3500) (62% solution of acrylic polymer of 15% styrene, 28% butyl methacrylate, 30% butyl acrylate, 10% 2-hydroxyethyl acrylate, 2% acrylic acid and 15% ethyl acrylate in a mixed solvent of 82% xylene and 18% 1-butanol) | 579 g |
| | Isopropanol | 22 g |
| | Mineral spirit | 41 g |
| | Heptane | 460 g |
| | Xylene | 95 g |
| Portion 2 | t-Butylperoctoate | 1 g |
| Portion 3 | Methacrylic acid | 40 g |
| | 2-Hydroxyethyl acrylate | 250 g |
| | Methyl methacrylate | 365 g |
| | Methyl acrylate | 180 g |
| | Styrene | 150 g |
| | Glycidyl methacrylate | 15 g |
| | Solution containing organic solvent-soluble polymer (same as portion 1) | 290 g |
| | Heptane | 26 g |
| Portion 4 | Mineral spirit | 148 g |
| | 1-Butanol | 26 g |
| | t-Butylperoctoate | 11 g |
| Portion 5 | t-Butylperoctoate | 8 g |
| | 1-Butanol | 59 g |
| | Heptane | 6 g |

SYNTHESIS EXAMPLE 3

Synthesis of Carboxylic Acid Oligomer (D-1)

A reactor equipped with a stirrer, a thermometer, a reflux condenser, a tube for introducing nitrogen gas and a dropping funnel was charged with 110 g of propylene glycol monomethyl ether acetate, 35 g of pentaerythritol and 0.07 g of triethylamine. After stirring at 120° C. for 15 minutes with introducing a nitrogen gas, 169 g of methylhexahydrophthalic anhydride was added over 15 minutes. Thereafter, the reaction was carried out at 120° C. for 3 hours, and disappearance of absorption (1,785 cm-1) based on acid anhydride group was confirmed by IR.

The solid concentration was 65%, and the number average molecular weight was 808.

EXAMPLES 1 TO 5 AND COMPARATIVE EXAMPLES 1 TO 6

The components obtained in Synthesis Examples 1 to 3 and components (D-2) and (E-1) mentioned after were mixed in the proportions (solid matter ratios) shown in Table 4.

In each example or comparative example, to the obtained mixture were added 0.4% of a levelling agent (L-1984-50 made by Kusumoto Kasei Kabushiki Kaisha), 2% of a ultraviolet absorber (Tinuvin 384 made by Ciba-Geigy AG) and 1% of a light stabilizer (Tinuvin 123 made by Ciba-Geigy AG) based on the total of the resin solid matters of the obtained mixture.

This mixture was diluted with Solvesso 100 (aromatic petroleum solvent made by Exxon Chemical Co.) so that the viscosity measured by a Ford viscosity cup fell within the range of about 20 to about 25 seconds, to give a clear top coat.

A mild steel plate which was degreased and subjected to a phosphatizing treatment was coated with an automobile epoxy amide cationic electroprimer and then with an intermediate surfacer to give a test specimen. The test specimen was coated with a commercially available acrylic melamine resin pain (black mica-containing base coat).

Thereonto was then coated the above clear top coat in a wet-on-wet manner, and after setting for 20 minutes, the coated specimen was baked at 140° C. for 30 minutes.

The dry thickness of the base coat was about 15 $\mu$m and the dry thickness of the clear top coat was about 50 $\mu$m.

With respect to the obtained coating film, the acid resistance, scratch resistance and pencil hardness were measured according to the following methods. The results are shown in Table 4.

(Acid Resistance)

Using a pipette, 0.5 ml of a 10% aqueous solution of sulfuric acid was dropped onto the coated specimen. After heating at 80° C. for 30 minutes in a dryer, the sulfuric acid solution was rinsed with water, and the change of the coating surface was observed and evaluated according to the following rating.

10: There is no change as compared with the coating before testing.

9: A slight change is observed.

8: Circular marks are observed.

7: Discoloration and blister are slightly observed.

5: Lowering of gloss and discoloration are clearly observed.

1: Dissolution of coating film is observed.

(Scratch Resistance) (Gloss Retention)

A coated specimen (150 mm×100 mm) was horizontally fixed, and an abrasive (a mixture of 1.2% of JIS No. 8 loam, 1.2% of JIS No. 11 loam, 0.6% of kaolin, 1% of a neutral detergent and 96% of water) was applied thereon in an amount of about 0.05 g/cm². A weight (diameter of contact surface 5 cm, load 22 g/cm²) covered with a kraft paper was stroked against the surface of the coating film.

The 20° gloss of the film surface was measured by a glossimeter (made by Kabushiki Kaisha Murakami Shikisai Gijutsu Kenkyusho) before stroke and after 20 stokes. The gloss retention (%) after 20 strokes was calculated according to the following equation.

Gloss retention (%)=(gloss after stroke/gloss before stroke)×100

The larger the gloss retention, the better the scratch resistance.

(Pencil Hardness)

Evaluated according to JIS K 5400.

TABLE 4

|  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Composition |  |  |  |  |  |  |  |  |  |  |  |
| A-1 | 65 | — | — | — | — | — | — | — | — | — | — |
| A-2 | — | 65 | — | — | — | — | — | — | — | — | — |
| A-3 | — | — | 60 | — | — | — | — | — | — | — | — |
| A-4 | — | — | — | 85 | — | — | — | — | — | — | — |
| A-5 | — | — | — | — | 73 | — | — | — | — | — | — |
| a-6 | — | — | — | — | — | 65 | — | — | — | — | — |
| a-7 | — | — | — | — | — | — | 65 | — | — | — | — |
| a-8 | — | — | — | — | — | — | — | 60 | — | — | — |
| a-9 | — | — | — | — | — | — | — | — | 85 | — | 85 |
| a-10 | — | — | — | — | — | — | — | — | — | 73 | — |
| B-1 | — | — | — | 5 | — | — | — | — | 5 | — | — |
| B-2 | 20 | 20 | 25 | — | 10 | 20 | 20 | 25 | — | 10 | — |
| B-3 | — | — | — | — | — | — | — | — | — | — | 5 |
| D-1 | — | — | 15 | 10 | 17 | — | — | 15 | 10 | 17 | 15 |
| D-2 | 15 | 15 | — | — | — | 15 | 15 | — | — | — | — |
| E-1 | 4 | 4 | 2 | — | — | 4 | 4 | 2 | — | — | — |
| Evaluation results |  |  |  |  |  |  |  |  |  |  |  |
| Acid resistance | 9 | 9 | 9 | 10 | 10 | 9 | 5 | 9 | 10 | 10 | 9 |
| Scratch resistance | 90 | 80 | 90 | 80 | 85 | 65 | 90 | 60 | 55 | 60 | 65 |
| Pencil hardness | HB | HB | F | F | HB | HB | B | F | F | HB | HB |

B-3: Polycarbonate diol (PLACCEL CD-210 made by Daicel Chemical Industries, Ltd., hydroxyl equivalent 500 g/mol)
E-1: Mixture of 20 g of dodecylbenzenesulfonic acid, 9 g of diisopropanolamine and 71 g of isobutanol From the results shown in Table 4, it is understood that the coating films formed from the paints obtained in Examples 1 to 5 are very excellent in acid resistance, scratch resistance and hardness and, in addition, are excellent in balance of physical properties.

INDUSTRIAL APPLICABILITY

The curable topcoat compositions of the present invention have an excellent thermosetting property, and the coating films formed therefrom are excellent in acid resistance, scratch resistance and hardness as well as excellent balance of physical properties. The compositions can be suitably used, for example, as top coat for automobiles, industrial equipments, steel furniture, interior and exterior of buildings, household electric appliances, plastic products and the like. The coated articles of the present invention coated with the curable topcoat compositions have characteristics as mentioned above.

What is claimed is:

1. A curable topcoat composition comprising:
    (A) 99.999 to 30 parts by weight of a vinyl copolymer, the main chain of which consists essentially of a vinyl copolymer, and which has in its molecule at the main chain end and/or on a side chain both at least one of alcoholic hydroxyl group and phenolic hydroxyl group and at least one hydrolyzable silyl group of the formula (I):

(I)

wherein $R^1$ and $R^2$ are hydrogen atom or a monovalent hydrocarbon group selected from the group consisting of an alkyl group having 1 to 10 carbon atoms, an aryl group and an aralkyl group, and a is 0, 1 or 2, and which has a carbonate structure of the formula (II):

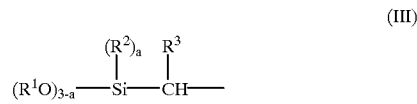

(II)

in the main chain and/or on a side chain,
    (B) 0.001 to 70 parts by weight of a hydroxyl group-containing compound having no hydrolyzable silyl group, and
    (C) a solvent, the total amount of the components (A) and (B) being 100 parts by weight.

2. The composition of claim 1, wherein said hydrolyzable silyl group of component (A) is bonded to carbon atom to form a group represented by the formula (III):

(III)

wherein a, $R^1$, and $R^2$ are as defined above, and $R^3$ is hydrogen atom, methyl group or ethyl group.

3. The composition of claim 1, wherein said component (B) is a copolymer of a hydroxyl group-containing vinyl monomer and a vinyl monomer containing no hydroxyl group.

4. The composition of claim 1, wherein said component (B) is a non-aqueous dispersion of a polymer obtained by dispersion polymerization of at least one hydroxyl group-containing vinyl monomer and at least one vinyl monomer containing no hydroxyl group in an organic solvent solution containing an organic solvent-soluble polymer having a number average molecular weight of 1,000 to 25,000 which is composed of 5 to 30 parts by weight of at least one hydroxyl group-containing vinyl monomer and 70 to 95 parts by weight of at least one vinyl monomer containing no hydroxyl group, the total thereof being 100 parts by weight, said polymer in said non-aqueous dispersion obtained by dispersion polymerization being insoluble in said organic solvent.

5. The composition of claim 1, which further contains (D) a compound having at least two carboxyl groups per molecule in an amount of at most 40 parts by weight per 100 parts by weight of the total of said components (A) and (B).

6. The composition of claim 1, which further contains (E) a curing catalyst in an amount of at most 10 parts by weight per 100 parts by weight of the total of said components (A) and (B).

7. The composition of claim 6, wherein said component (E) is a sulfonic acid compound blocked with an nitrogen-containing compound, and said nitrogen-containing compound is at least one member selected from the group consisting of a primary or secondary amine having at least one hydroxyl group in its molecule, morpholine and oxazolidine.

8. A coated article wherein a clear top coat comprising as a main component the curable topcoat composition of claim 1 is coated onto the surface coated with a paint containing a metallic powder and/or a color pigment.

* * * * *